(12) United States Patent
Ke et al.

(10) Patent No.: US 10,891,847 B2
(45) Date of Patent: Jan. 12, 2021

(54) VISIBLE INDICATION OF A PORT AS CONFIGURED TO MANAGEMENT FUNCTIONALITY

(71) Applicant: HEWLETT PACKARD ENTERPRISE DEVELOPMENT LP, Houston, TX (US)

(72) Inventors: Min-Lung Ke, Taipei (TW); Peter Liao, Taipei (TW); Chun-Hua Huang, Taipei (TW); Chih-Chieh Wang, Taipei (TW); Yi-Hsun Chen, Taipei (TW)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 16/412,382

(22) Filed: May 14, 2019

(65) Prior Publication Data

US 2019/0279484 A1    Sep. 12, 2019

Related U.S. Application Data

(63) Continuation of application No. 15/774,687, filed as application No. PCT/US2015/060056 on Nov. 11, 2015, now Pat. No. 10,319,211.

(51) Int. Cl.
*G08B 21/18* (2006.01)
*H04L 29/04* (2006.01)
(Continued)

(52) U.S. Cl.
CPC ............ *G08B 21/18* (2013.01); *G06F 11/006* (2013.01); *G06F 11/3031* (2013.01); *G06F 11/325* (2013.01); *G06F 11/328* (2013.01); *G08B 5/36* (2013.01); *H04L 29/04* (2013.01); *H04L 41/24* (2013.01)

(58) Field of Classification Search
CPC combination set(s) only.
See application file for complete search history.

(56) References Cited

U.S. PATENT DOCUMENTS 8,516,089 B2   8/2013  Johnsen et al.
8,611,234 B1   12/2013 Gershman
(Continued)

FOREIGN PATENT DOCUMENTS

CN       104182010 A      12/2014
WO       2015/165925 A1   11/2015
WO    WO-2015165925 A1 *  11/2015  ............. H05B 45/48

OTHER PUBLICATIONS

International Search Report and Written Opinion received for PCT Patent Application No. PCT/US2015/060056, dated Aug. 9, 2016, 9 pages.

(Continued)

*Primary Examiner* — Travis R Hunnings
(74) *Attorney, Agent, or Firm* — Hewlett Packard Enterprise Patent Department (57) ABSTRACT

Examples herein disclose an apparatus. The apparatus includes a network interface controller (NIC) port to be dedicated to a management functionality of a server. The apparatus also includes a light emitting diode (LED), coupled to the NIC port, to provide a visible indication that the NIC port is dedicated to the management functionality of the server.

20 Claims, 5 Drawing Sheets

(51) Int. Cl.
  *H04L 12/24* (2006.01)
  *G06F 11/32* (2006.01)
  *G06F 11/00* (2006.01)
  *G06F 11/30* (2006.01)
  *G08B 5/36* (2006.01)

(56) References Cited

U.S. PATENT DOCUMENTS

| | | |
|---|---|---|
| 2004/0176927 A1* | 9/2004 | Chen ................ G06F 11/328 702/182 |
| 2012/0069730 A1 | 3/2012 | Johnsen |
| 2012/0166693 A1 | 6/2012 | Weinstock et al. |
| 2014/0218199 A1 | 8/2014 | Cepulis et al. |
| 2015/0058538 A1 | 2/2015 | Chao et al. |

OTHER PUBLICATIONS

Oracle; "Sun SPARC Enterprise T5140 and T5240 Servers," Service Manual, Part No. 820-3318-14, Dec. 2010, pp. 1-234, Revision A.

* cited by examiner

VISIBLE INDICATION OF A PORT AS CONFIGURED TO MANAGEMENT FUNCTIONALITY

CROSS REFERENCE TO RELATED APPLICATIONS

This application is a continuation and claims the benefit, under 35 U.S.C. § 120, of U.S. patent application Ser. No. 15/774,687, filed on May 9, 2018, now U.S. Pat. No. 10,319,211, which is a 371 National Stage Entry of PCT/US2015/060056, filed on Nov. 11, 2015, which are incorporated herein by reference in their entirety.

BACKGROUND

A network interface controller (NIC), also known as a network interface card, networking adapter, or by other similar terms, is a hardware component which connects a server to a network. The NIC includes a series of networking ports, also referred to as NIC ports, which may be used for various functionality purposes including management, downloading information, connection purposes, networking, etc.

BRIEF DESCRIPTION OF THE DRAWINGS

In the accompanying drawings, like numerals refer to like components or blocks. The following detailed description references the drawings, wherein.

DETAILED DESCRIPTION

In networking, a server may have multiple networking ports, such as NIC ports. These networking ports may be composed of conductors providing an electrical paths to various circuitry such as a mainboard, a networking module, and standard Peripheral Component Interconnect Express (PCIe) interface, network interface controllers (NIC), etc. One of these networking ports may be configured to provide server management functionality. However clue to design constraints, there are no visible indications identifying which networking port is configured to provide the management functionality. For example, theses networking ports may look identical which makes it difficult for an administrator to accurately identity the management networking port from the other networking ports.

Additionally, when the server experiences an issue, time is of the essence for an administrator to accurately identify which port among the multiple ports is configured or dedicated to the management functionality. Accurately identifying the port, the administrator may quickly resolve the issue.

To address these issues, examples provide a light emitting diode (LED) to visibly indicate whether a particular networking port (e.g., NIC port) is configured or dedicated to the management functionality of the server. The management functionality as used herein, provides access to a management controller (e.g., networking controller) such that administrative functionalities may be performed. Such administrative functionalities may include performing updates to software, firmware, programming the server, etc. Using the LED to provide the visible indication allows the administrator to accurately and quickly identify the NIC port dedicated to the management functionality from the other NIC ports.

Additionally in the servicing environment, if network cables are unplugged from the server, the administrator may identify which NIC port is configured for the management functionality. This can keep the management functionality path cable in place to prevent an accidental interruption of the management functionality cable.

In other examples, the LED may output a different pattern if the NIC port is configured for a different functionality. These other functionalities (other than the management functionality) as used herein includes non-administrative type of functionalities which have less direct control over the server. As such, these other functionalities include downloading information, monitoring the server, accessing the server, providing a network connection, etc. Providing different patterns representative of these other functionalities, enables the administrator to accurately identify which NIC port provides the non-administrative functionalities.

Figure 1:
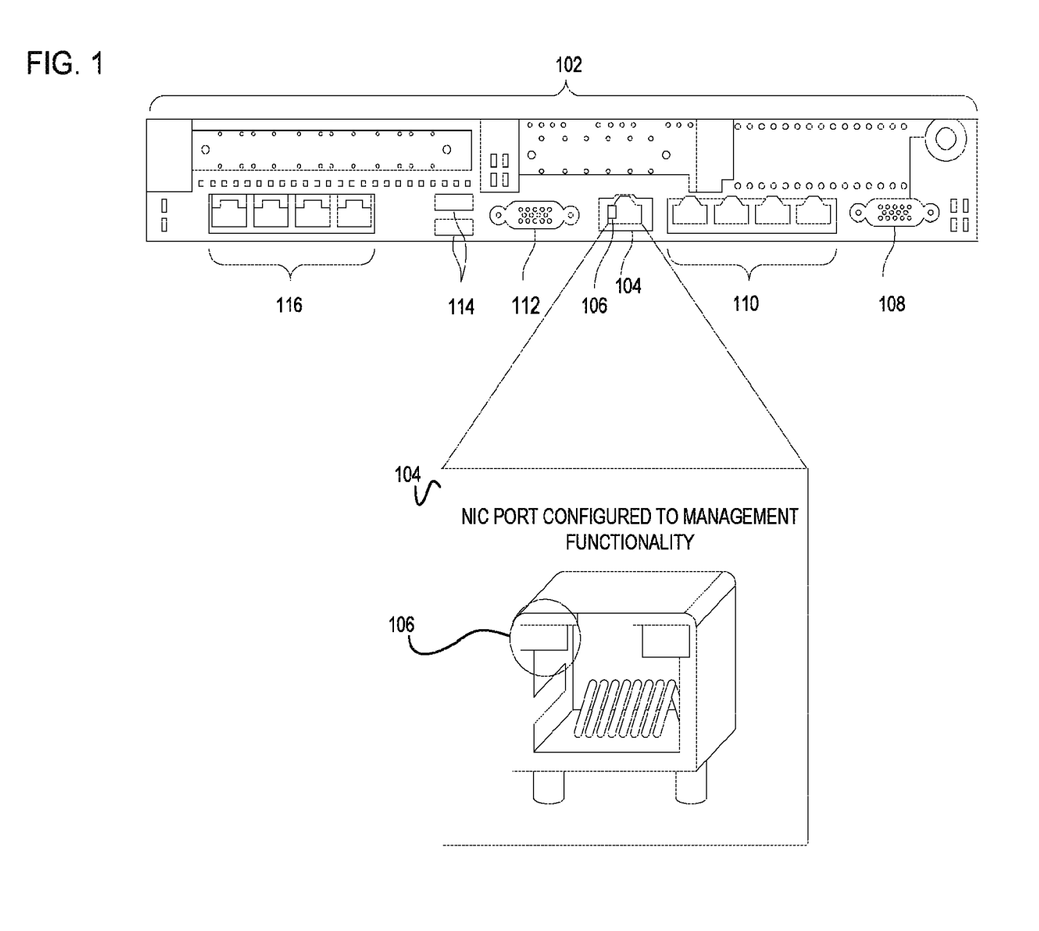
FIG. 1 illustrates an example server from a rear perspective including a NIC port and corresponding light emitting diode (LED) to perform a visual indication representing a management functionality status of the NIC port.

Referring now to FIG. 1, illustrates an example server 102 from a rear perspective. The server 102 includes a NIC port 104 configured as providing server management functionality. The NIC port 104 includes an LED 106 to provide a visual indication representing the server management functionality. The LED 106 corresponds to the NIC port 104 to perform the visual indication representing the management functionality status of the NIC port 104. Additionally, the server 102 includes general NIC ports 110 configured to provide functionalities other than the server management functionality and other components such as a video connector 108, serial port connector 110, Universal Serial Bus (USB) connectors 114, and other adapters 116 to provide additional connections to the server 102. The NIC port 104 and general NIC ports 110 are networking ports which provide Ethernet ports to the server 102. As such, each port 104 and 110 are Ethernet capable and compliant with IEEE 802® standards.

The server 102 is part of a network which manages and provides access from client devices to the networking system. The server 102 also includes internal circuitry (not illustrated) to provide a control signal to the LED 106 and access to the networking system. The internal circuitry may be detailed in later figures. Although the rear panel of the server 102 illustrates components 104-116, implementations should not be limited as the video connector 108 and/or other illustrated components 110-116 may be optional. Additionally, the rear panel of the server 102 may further include other components not illustrated, such as cooling fans, etc. Implementations of the server 102 include, by way of example, a database server, mail server, file server, domain name system (DNS) server, print server, web server, game server, application server, cartridge server, blade server, catalog server, communication server, home server, media server, proxy server, or other type of computing device capable of managing client devices and providing access to the networking system.

The NIC port dedicated to the management functionality 106 is considered the networking port configured to support the management functionality. As such, the NIC port 106 includes a number of conductors which are connected to the internal circuitry (not illustrated) of the server 102. The connections from the conductor in the NIC port 106 to the server 102 enables the server 102 to access the networking system from various client device(s). The NIC port 106 is considered dedicated to the management functionality 106 in the sense that the NIC port 106 is configured to handle the management functionality of the server 102. In this implementation, the LED 106, coupled to the NIC port 104, emits the visual indication representative of a status of the management functionality. The status of the management functionality indicates the current state of the configuration of NIC port 104, such as whether the NIC port 104 is currently configured to handle the management functionality of the server 102. In implementations, the NIC port 106 includes a standardized modular connector, such as an RJ45 connector, RJ48 connector, 8P8C connector, 4P4C connector, 6P6C connector, or other type of modular connector.

The LED 106 is coupled to the NIC port 104 to emit the visual indication representing the management functionality status. The LED 106 is a two-lead semiconductor capable of emitting light as the visible indication. The LED 106 may include a combination of p-n and/or n-p junctions which emit light when activated. Upon a suitable voltage applied to the leads, electrons are recombined with electron holes within the LED 106 thus releasing energy in the form of photons. This effect, known as electroluminescence, emits the visible light. The visible light may change in color depending on the energy of the photon and energy band gap of the LED 106. As such, the LED 106 emits visible indications in the form of light which may change in color and/or pattern. The emission of the light in color and/or pattern represents a functionality of the NIC port 104, such as whether the NIC port 104 is configured to provide the management functionality of the server 102. Although the LED 106 is illustrated as part of the NIC port 104, implementations should not be limited as the LED 106 is considered adjacent to the NIC port 104. As such, the LED 106 may be illustrated as separate from the NIC port 104 on the rear panel of the server 102.

The video connector 108, on the server 102 chassis back panel, is a connector which allows a video device or other imaging device to connect to the server 102. The video connector 108 is considered an optional feature to the server 102 in the sense that the video connector 108 does not directly provide the capabilities to provide access to the networking system. Rather, the video connector 108 provides an optional feature of connecting the video device to the server 102.

The general NIC ports 110 are those networking ports which are configured to provide functionalities other than the management functionality. The management functionality provides access to a management controller to provide administrative functionalities such as performing updates to software, firmware, and/or programming the server 102, etc. The other functionalities include the other non-administrative functionalities such as downloading information, accessing the server 102, monitoring the server 102, etc. The general NIC ports 110 each include a number of conductors to form an electrical path to the internal circuitry of the server 102. In implementations, the NIC port 106 includes a standardized modular connector, such as arm RJ45 connector, RJ48 connector, 8P8C connector, 4P4C connector, 6P6C connector, or other type of modular connector.

The serial port connector 112, USB connectors 114, and additional adapters 116 are located on the server 102 chassis back panel. Each of these components 112-116 provide an additional connection to the server 102. For example, the serial port connector 112 provides a serial communication interface through which information is transferred in and out of the server 102. The USB connectors 114 enable additional peripheral devices access to the server 102. The additional connection adapters 116 provide an additional connections for accessing the server 102.

Figure 2:
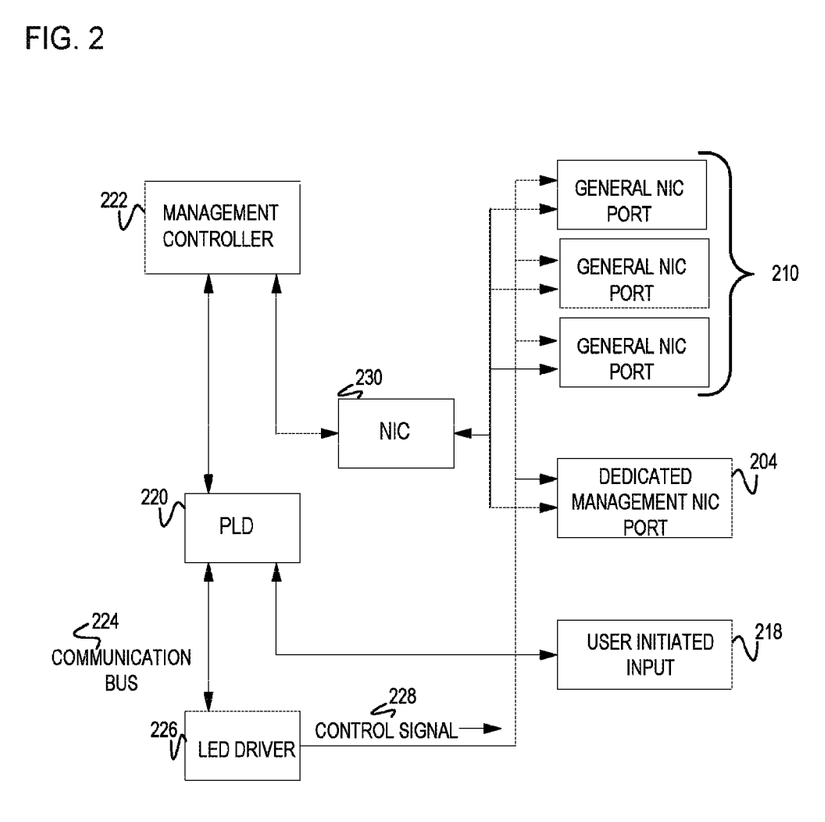
FIG. 2 illustrates an example circuit diagram of a server including a NIC port dedicated to a management functionality and other general NIC ports.

FIG. 2 illustrates an example circuit diagram of a server including a NIC port 204 dedication or configured to management functionality and other general NIC ports 210. Each of the NIC ports 204 and 210 are connected to a network interface card (NIC) 230 to provide access to a networking system. The NIC 230 interfaces through a management controller 222. The management controller 222 provides the management of the server and interfaces with a programming logic device (PLD) 220. Upon a user initiated input 218, the PLD 220 receives a signal indicating to the system to perform the visible indication. The user initiated input 218 may include a button, switch, or other type of user initiated input capable of providing a request to the PLD 220. In this implementation, the PLD 220 receives the signal, such as an interrupt signal from the user initiated input 218 and in turn communicates over a communication bus 224 to an LED driver 226. The LED driver 226 provides a control signal 228 to an LED (not illustrated) coupled to the NIC port 204. The LED provides the visual indication representing the management functionality of the NIC port 204 based on receiving the control signal 228 from the PLD 220. Based on receiving the interrupt signal from the enablement of the user initiated input 218, the interrupt signals to the PLD 220 to transmit a signal to the LED driver 226 to change the visual indication of lighting pattern on the LED. In this implementation, the LED corresponding to the NIC port 204 may initially display the visual indication (e.g., emit a pattern of light) representing whether the NIC port 204 has a current connection to the networking system. If the NIC port 204 has no connection to the networking system, the LED may remain unlit. An administrator may desire to identify which of the NIC ports 204 and 210 are configured to the management functionality. Thus the administrator may enable the user initiated input 218 by mechanically depressing, switching or other type of mechanical action to enable 218. For example, the user initiated input 218 may include a button thus upon the enablement of the button, an interrupt signal is transmitted to the PLD 220. The PLD 220 in turn transmits the signal over the communication bus 224 to the LED driver 226. The LED driver 226, in response to receiving the signal from the PLD 220, transmits the control signal 228 to the LED associated with the NIC port 204. The control signal 228 indicates to the LED to change the pattern of light emission to represent whether the NIC port 204 is currently configured to provide management functionality to the server.

Figure 3:
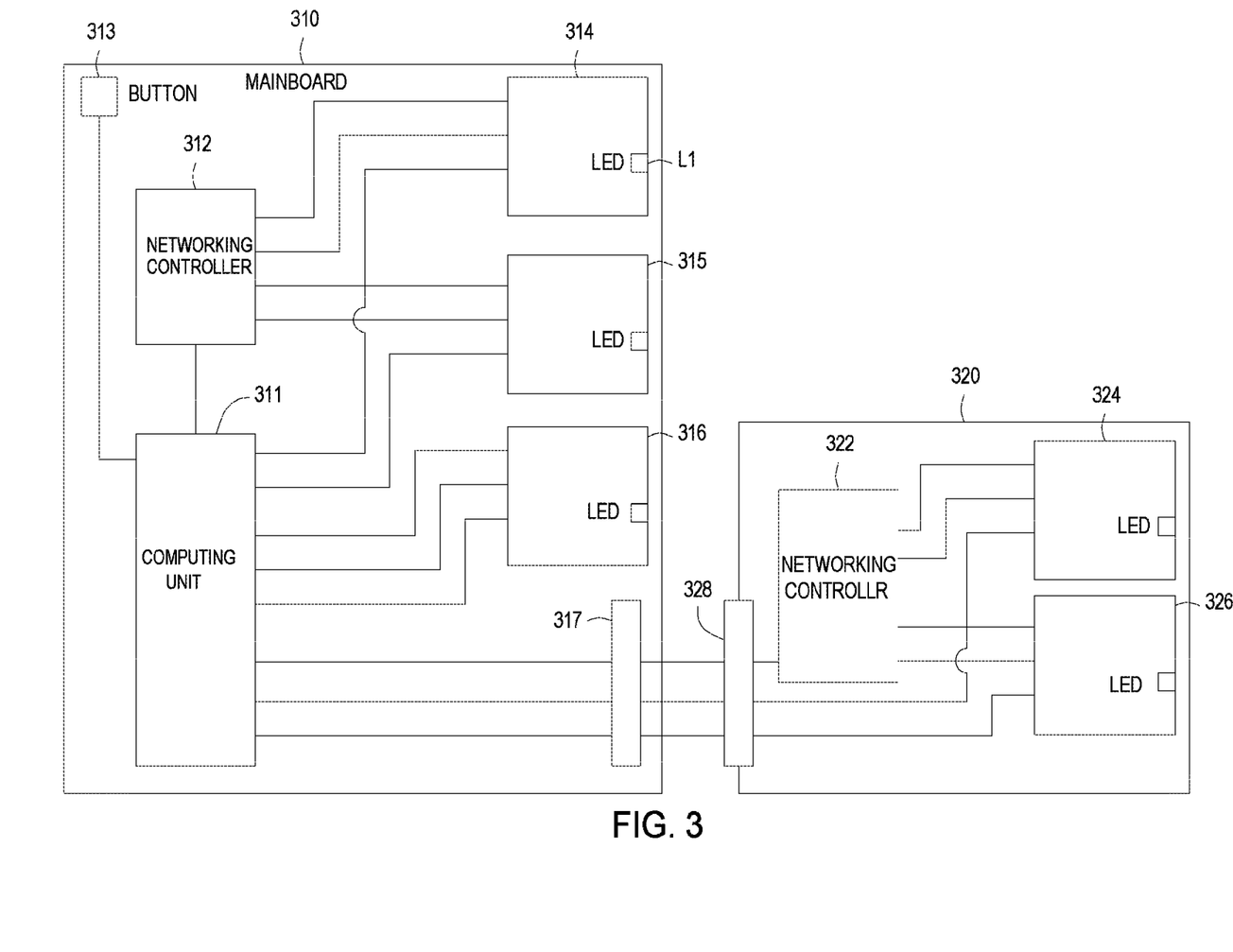
FIG. 3 illustrates an example circuit diagram of a server including electrical connections between a mainboard, network card, and NIC ports.

FIG. 3 illustrates an example circuit architecture in a server 302. As such, the server 302 includes a mainboard 310 and a networking card 320. The mainboard 310 includes an installed computing unit 311 and a networking controller 312. The computing unit 311 may be similar in structure and functionality to the PLD as in FIG. 2 and as such, implementations include a chipset, a processor, a Field Programmable Gate Array (FPGA), a main control unit (MCU), a semiconductor, an embedded circuit, etc. The networking controller 312 controls NIC ports 314-316 and as such, may include a communication bus to interface with the computing unit 311 for management and NIC port state communication.

The mainboard 310 also includes a connector 317 and button 313. The connector 317 provides a connection from the mainboard 310 to the networking card 320. The button 313 is used to enable an interrupt signal to the computing unit 311. As such, the button 313 is used to facilitate a visible indication request from an administrator to the server 302.

The networking card 320 may include networking controller 322 and NIC ports 124 and 126. The networking controller 322, coupled to connector 128, interfaces with the mainboard 310.

The server 302 may be configured to provide the management functionality to one of the NIC ports 314-316 and 324-326. For example, the NIC port 314 may be dedicated to provide the management system functionality. In this example the button 313 allows the administrator to request the visible indication event. When the button 313 detects a press unit, the button 313 transmits the interrupt signal to the computing unit 311. The computing unit 311 receives the interrupt signal and identifies this request and checks port management status and transmits the control signal to that port (e.g., NIC port 314) which is configured as the management functionality port. In this example, the NIC port 314 receives a control signal from the computing unit 311 indicating for the LED coupled to the NIC port 314 to visibly indicate whether the NIC port 314 is current configured for the management functionality. The LEDs coupled to the other NEC ports 315-316 and 324-326 may receive a signal indicating to perform a different visible indication representing the network connectivity. The LED coupled to the NIC port 314 then performs the visible indication, such as the lighting pattern representative that the NEC port 314 is configured for the management functionality.

Figure 4:
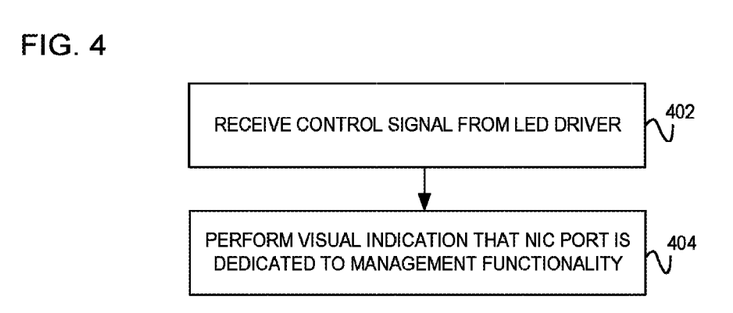
FIGS. 4-5 illustrate example flow diagrams in accordance with the present disclosure.

FIG. 4 illustrates a flowchart of an example method for an LED to perform a visual indication representing a management functionality status of a NIC port. The method is executable by a server and as such, operations 402-404 may be performed by the server's networking components. Such networking components to perform operations 402-404 may include a management controller, programming logic device, LED driver, LED, etc. One or combination of such networking components collaborate to perform the visual indication representing the management functionality status of the NIC port. The networking component(s), such as the LED, receives a control signal from the LED driver. In response to receipt of the control signal, the LED performs the visual indication representing whether the NIC port corresponding to the LED is dedicated to the management functionality of a server. In discussing FIG. 4, references may be made to the components in FIGS. 1-3 to provide contextual examples. In one implementation, a management controller executes operations 402-404 for the LED to perform the visual indication representing the NIC port management functionality status. Using the LED to perform the visual indication of the corresponding NIC port management status, the NIC port in management mode is accurately identified. Although FIG. 4 is described as implemented by one or more networking components, it may be executable on other suitable components. For example, FIG. 4 may be implemented in the form of executable instructions on a machine-readable storage medium, executable by the one or more of the networking components.

At operation 402, the LED receives a control signal from the LED driver. The LED is capable of performing of performing different visual indications each representing a different functionality of the corresponding NIC port. The control signal allows the LED to have different visual indications representing a network connectivity status of the NIC port and then the management functionality status. In this manner, the control signal manages which visual pattern the LED displays representing the either the network connectivity status or the management functionality status. For example, the LED may perform the visual pattern of several blinks to indicate the network connectivity status. In this example, the control signal is transmitted to the LED to change the visual pattern from the several blinks to the visual pattern representing that the management functionality status of the NIC port. Changing the visual pattern through the use of the control signal, enables the server to represent various functionalities of the NIC port though an additional LED. This allows the server to utilize an existing LED.

At operation 404, the LED performs the visual indication that the corresponding NIC port is dedicated to the management functionality of the server. The visual indication includes various light patterns performed by the LED to represent the management functionality status of the NIC port. The status includes whether the corresponding NIC port is capable of the management functionality. For example, the LED may perform a fade-on and fade-off pattern to visually represent that the corresponding NIC port includes the management functionality capabilities. In another implementation, if the NIC port is incapable of supporting the management functionality, the LED may include a different light pattern, such as the absence of the light. Performing the visual indication, enables an administrator to visually identify the specific NIC port of a rear I/O view of the server.

Figure 5:
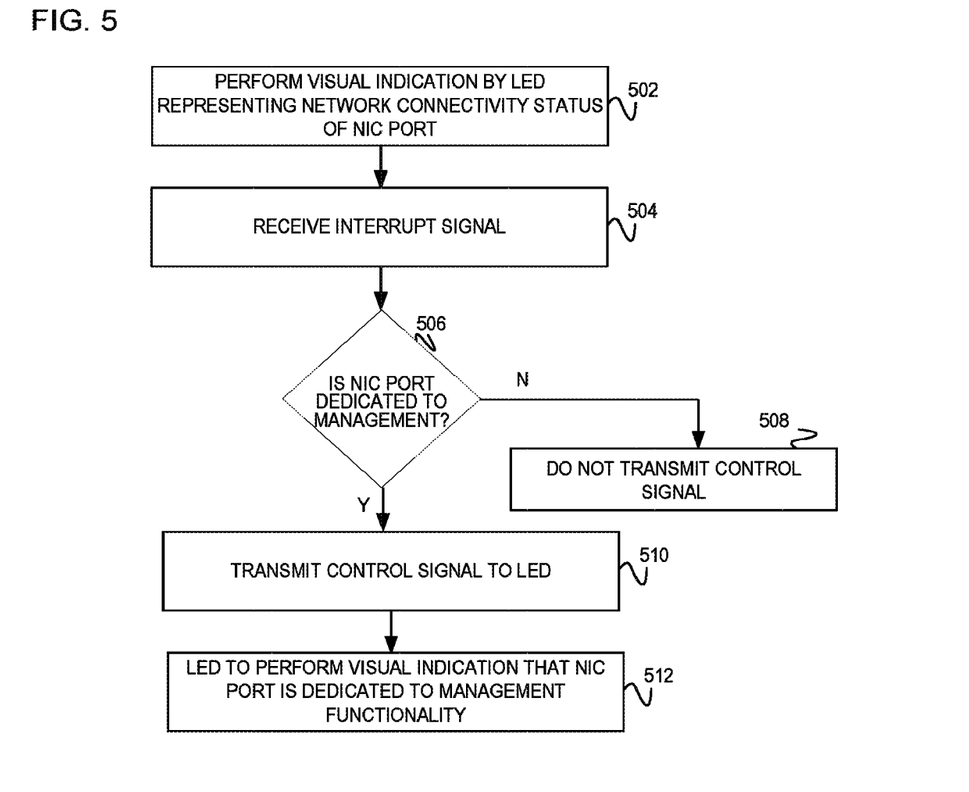

FIG. 5 illustrates a flowchart of an example method for an LED to perform various visual indications. The various visual indications represent a network connectivity status and a management functionality status of a corresponding NIC port. The method is executable by a server and as such, operations 502-512 may be performed by the server's various networking components. Such networking components may include a management controller, programming logic device, LED driver, LED, etc. Accordingly, one or combination of such networking components collaborate to perform the various indications representing various status functionalities of the corresponding MC port. In discussing FIG. 5, references may be made to the components in FIGS. 1-3 to provide contextual examples. In one implementation, the server as in FIG. 1 executes operations 502-512 for the LED to perform the visual indications representing the NIC port network connectivity status and the management functionality status. Although FIG. 5 is described as implemented by one or more networking components, it may be executable on other suitable components. For example, FIG. 5 may be implemented in the form of executable instructions on a machine-readable storage medium, executable by the one or more of the networking components.

At operation 502, the LED as a networking component of the server, performs the visual indication representing the network connectivity status of the corresponding NIC port. Specifically, the LED is adjacent to the NIC port of the server. As such, the LED may perform a lighting pattern that serves as the visual indication representing the network connectivity status of the NIC port. The network connectivity status defines whether the NIC port is connected to a network at a given time. If the NIC port is without network connectivity, the LED may remain unlit. This means the server may not be linked to the network. If the NIC port is with the network connectivity, the LED may perform the visual indication, such as blinking signifying the server is linked to the network. The visual indication representing the network connectivity status is considered an initial display pattern prior to a change in pattern as at operation 512.

At operation 504, the server receives an interrupt signal. Specifically, a unique identifier input, such as a button) is enabled temporarily transmitting a signal to a programming logic device (PLD). The PLD receives the interrupt signal which indicates to the PLD to transmit a control signal through an LED driver to change the visual indication at the LED. The change in the visual indication (e.g., lighting pattern) enables the LED to perform the visual indication for the management functionality status of the corresponding NIC port.

At operation 506, the server identifies whether NIC port corresponding to the interrupt signal received from the input mechanism is capable of the management functionality. In one implementation, input may be provided at each NIC port to request the management functionality status of each NIC port. In this implementation, each NIC port includes its own input, such the button. Thus, when each button is enabled, the PLD may identify the corresponding NIC port to then transmit the control signal as at operation 510. In another implementation, the input is exclusive to the NIC port which may be capable of management functionality. Thus, when the input is enabled, a request to display the visual indication related to the management functionality. If at operation 506, the server identifies that the particular NIC port corresponding to the input is dedicated to the management functionality, the server proceeds to operation 510 and transmits the control signal. The PLD transmits the control signal to the LED driver and in turn to the LED. The control signal directs the LED to display the visual indication representative that the particular NIC port is capable of the management functionality. This allows identification of whether the certain NIC port is in management functionality for servicing and/or programming the server. If at operation 506, the server determines the NIC port corresponding to the input is not capable or dedicated to the management functionality, the server proceeds to operation 508 and proceeds to not transmit the control signal.

At operation 508, the server does not transmit the control signal to the LED upon the determination that the particular NIC port is incapable of handling the management functionality. In one implementation of operation 508, the LED corresponding to the particular NIC port may not emit light or remain unlit. If the server determines that the given or particular NIC port is not dedicated to the management functionality, this may indicate the NIC port is capable of handling other functionalities other than the management functionality. For example, these other functionalities may include downloading information, accessing data within the server, etc.

At operation 510, the server transmits the control signal to the LED to change performance of the visual indication. At operation 510, upon receiving the interrupt signal as at operation 504 and identifying the given NIC port is configured for the management functionality, the PLD transmits the controls signal modify the light pattern performed by the LED. Operation 510 may be similar in functionality to operation 402 as in FIG. 4.

At operation 512, the LED receives the control signal from the LED. The control signal allows the LED to implement a unique behavior (e.g., lighting pattern) to identify whether the given NIC port is configured to the management functionality of the server. The lighting pattern of the LED serves as the display indication representing that the given NIC port is configured for the management functionality. Operation 512 may be similar in functionality to operation 404 as in FIG. 4.

Although certain embodiments have been illustrated and described herein, it will be greatly appreciated by those of ordinary skill in the art that a wide variety of alternate and/or equivalent embodiments or implementations calculated to achieve the same purposes may be substituted for the embodiments shown and described without departing from the scope of this disclosure. Those with skill in the art will readily appreciate that embodiments may be implemented in a variety of ways. This application is intended to cover adaptions or variations of the embodiments discussed herein. Therefore, it is manifestly intended that embodiments be limited only by the claims and equivalents thereof.

We claim:

1. An apparatus comprising:
   a panel;
   a networking port coupled to the panel and configured for a networking functionality of a server; and
   a light emitting diode (LED), coupled to the panel as separate from the networking port, and to provide a visible indication of a status of the network functionality, wherein the networking functionality comprises a management functionality of the server.

2. The apparatus of claim 1, wherein the networking port comprises a network interface controller (NIC) port and the LED is coupled adjacent to the NIC port.

3. The apparatus of claim 2, wherein the status of the network functionality indicates the current state of the configuration of the NIC port.

4. The apparatus of claim 3, wherein the LED emits the visible indication in the form of light which may change color and/or pattern.

5. The apparatus of claim 4, wherein the LED is to:
   output a first pattern indicative of the status of the network functionality being a management functionality; and
   output a second pattern indicative of status of the network functionality being a non-management functionality.

6. The apparatus of claim 5, wherein the first output pattern is discernable from the second output pattern to identify when the current state of the configuration of the NIC port is the management functionality.

7. The apparatus of claim 6, wherein the non-management functionality comprises at least one of: downloading information; monitoring the server; accessing the server; and providing a network connection.

8. A server, comprising:
   a network interface controller; and
   a plurality of networking ports coupled to the network interface controller, wherein the plurality of network ports comprises:
   at least one general networking port; and
   a management network interface controller (NIC) port, wherein the management NIC port comprises:
   a light emitting diode (LED) coupled to the server management port and to provide a visible indication that the server management port is dedicated for the management functionality of the server.

9. The server of claim 8, further comprising:
   a light emitting diode (LED) driver to:
   receive an interrupt signal;
   transmit a control signal to the LED of the management NIC port based on the interrupt signal enabling the LED to visibly indicate that the management NIC port is dedicated for the management functionality of the server based on receipt of the control signal.

10. The server of claim 9, further comprising:
a programmable logic device (PLD) coupled to the LED driver; and
a management controller coupled to the PLD and providing management of the server.

11. The server of claim 10, wherein the programmable logic device (PLD), is to:
receive an input requesting a status of the management NIC port; and
transmit a signal to the LED driver for the management NIC port to visibly indicate that it is dedicated to the management functionality of the server.

12. A server, comprising:
a network interface controller; and
a plurality of networking ports coupled to the networking controller, wherein each of the plurality of networking ports are configured for a respective networking functionality of the server and comprise:
a light emitting diode (LED) to provide a visible indication of a status of the respective network functionality, wherein one of the respective networking functionality comprises a management functionality of the server.

13. The server of claim 12, wherein a selected networking port of the plurality of network ports is configured for the management functionality of the server.

14. The server of claim 13, further comprising:
a computing unit to:
receive an interrupt signal;
transmit a control signal to the LED of the selected networking port based on the interrupt signal enabling the LED of the selected networking port to visibly indicate that the selected networking port is dedicated for the management functionality of the server based on receipt of the control signal.

15. The server of claim 14, wherein the computing unit is to:
receive the interrupt signal in response to a request to indicate the networking port that is configured for management functionality of the server; and
check the status of the respective networking functionality for each of the plurality of networking ports coupled to the networking controller.

16. The server of claim 15, wherein the request corresponds to a user input.

17. The server of claim 16, further comprising:
a button, coupled to the computing unit, to transmit the interrupt signal, and wherein the user input comprises pressing the button.

18. The server of claim 12, wherein the LED is to provide a visible indication of the server management port connection status.

19. The server of claim 18, wherein the server management port connection status is indicative of whether the server management port has a current connection to the networking system.

20. The server of claim 19, wherein the LED is to:
emit the visible indication in the form of light indicative of the server management port having a current connection to the networking system; and
remain unlit as the visible indication indicative of the server management port not having a current connection to the networking system.

* * * * *